(12) United States Patent  (10) Patent No.: US 8,234,919 B2
Arnoldo et al.  (45) Date of Patent: Aug. 7, 2012

(54) TIRE PRESSURE CONTROL SYSTEM

(75) Inventors: Sven Arnoldo, Malsch (DE); Uli Maier, Heilbronn (DE); Michael E. Luppold, Dettenheim-Lie (DE)

(73) Assignee: BorgWarner BERU Systems GmbH, Ludwigsburg (DE)

( * ) Notice: Subject to any disclaimer, the term of this patent is extended or adjusted under 35 U.S.C. 154(b) by 0 days.

(21) Appl. No.: 12/864,108

(22) PCT Filed: Nov. 22, 2008

(86) PCT No.: PCT/EP2008/009921
§ 371 (c)(1),
(2), (4) Date: Nov. 2, 2010

(87) PCT Pub. No.: WO2009/092414
PCT Pub. Date: Jul. 30, 2009

(65) Prior Publication Data
US 2011/0036159 A1  Feb. 17, 2011

(30) Foreign Application Priority Data
Jan. 24, 2008 (DE) .......................... 10 2008 005 715

(51) Int. Cl.
*B60C 23/02* (2006.01)

(52) U.S. Cl. ...................................................... 73/146.8
(58) Field of Classification Search .......... 73/146–146.8
See application file for complete search history.

(56) References Cited

U.S. PATENT DOCUMENTS

| 4,763,517 A * | 8/1988 | Feinberg ...................... 73/146.8 |
| 5,090,237 A * | 2/1992 | Schrumpf et al. ........... 73/146.5 |
| 5,844,131 A | 12/1998 | Gabelmann et al. |
| 6,055,855 A * | 5/2000 | Straub ........................ 73/146.8 |
| 6,805,000 B1 * | 10/2004 | Sheikh-Bahaie ............ 73/146.8 |
| 6,912,897 B2 * | 7/2005 | Luce ........................... 73/146.8 |
| 7,040,155 B1 | 5/2006 | Lundell et al. |
| 2006/0196259 A1 | 9/2006 | Hsu et al. |

* cited by examiner

*Primary Examiner* — Andre Allen

(57) ABSTRACT

A tire pressure control system includes a tire valve and wheel electronics including a pressure measuring device and a transmission device in a housing, wherein the housing has two base elements on a bottom for attaching the same to a rim well of a wheel, and a contact surface seated on a valve spud of the tire valve in the mounted state. The surface has an elongated hole through which the tire valve projects in the mounted state. The invention provides that the contact surface can be linearly displaced in the direction of the elongated hole on the valve spud during installation.

14 Claims, 2 Drawing Sheets

TIRE PRESSURE CONTROL SYSTEM

The invention relates to a tire pressure control system.

A tire pressure control system known from EP 0 751 017 B1 comprises a wheel electronic system which contains a pressure measuring device and a transmission device in a housing. The housing of the wheel electronic system is attached to the tire valve of a pneumatic tired wheel, with the result that two foot elements arranged on the bottom side of the housing rest on the rim well. On its rear side, the housing of the wheel electronic system has a contact surface with an elongated hole, said contact surface being seated on the valve base of the tire valve in assembled condition, with the result that the tire valve projects through the elongated hole.

In the tire pressure control system known from EP 0 751 017 B1, the contact surface is formed as a cavern which is seated on a rounded valve base in assembled condition. During assembly, the wheel electronic system on the valve base can be swiveled in the direction of the elongated hole, with the result that the wheel electronic system can always rest with its foot elements on the rim well in assembled condition, irrespective of the level of the rim well, i.e., the position of the valve body bore in relation to the rim well. In this manner, the known tire pressure control system allows adjustment to the geometric conditions of a given rim. This is important because rims with different shapes are in use and it should be possible to use the wheel electronic system with the associated tire valve of an tire pressure control system in as universal a manner as possible.

However, the production of a housing for the wheel electronic system with a cavern and a matching valve base is complicated and laborious.

The invention provides for a tire pressure control system, which requires less complexity and laboriousness and which can be used for different rim geometries and facilitates a stable support on a rim well.

SUMMARY OF THE INVENTION

In a tire pressure control system according to the invention, an adjustment to a given rim geometry can be made during assembly by linearly displacing the wheel electronic system on the valve base. In this manner, it is possible to achieve that the housing of the wheel electronic system rests on the rim well with both of its foot elements, irrespective of the level of the rim well of a given rim. That is why a tire pressure control system according to the invention facilitates a stable three-point support of the wheel electronic system, i.e., on the valve base and the two foot elements, in all current vehicle wheels, therein requiring little complexity and laboriousness. If use is made of oblong foot elements, for example ribs on the longitudinal sides of the housing, it is even possible to achieve that the wheel electronic system rests on the rim well with both of its foot elements in a linear manner or with an oblong surface.

Preferably, the contact surface of the wheel electronic system is formed flat because this is the easiest way to produce it. However, this is not required for the ability of the wheel electronic system to be displaced in the direction of the elongated hole according to the invention. For example, the contact surface can also be formed as a circumferential surface of a half cylinder extending in the direction of the elongated hole or comprise ribs or grooves extending in parallel to the elongated hole. Likewise, a bearing surface of the valve base on which the contact surface of the wheel electronic system is sliding during displacement is, preferably, formed flat.

Preferably, the contact surface extends slanted in relation to the bottom side of the housing. Therein, the contact surface can be formed planar or may comprise a structure, for example ribs extending in the direction of the elongated hole.

Preferably, the tire valve comprises a hollow screw which is inserted into the valve base and projects through the elongated hole. Before the hollow screw is tightened, the wheel electronic system can be displaced on the valve base to adjust the tire pressure control system to a given level of the rim well. By tightening the hollow screw, the wheel electronic system is pressed against the valve base, with the result that frictional forces prevent a displacement during driving.

An advantageous further development of the invention provides that the elongated hole is arranged in a plate-shaped section of the rear side of the housing. In this manner, it is particularly easy and cost-effective to create a contact surface that facilitates a linear displacement of the wheel electronic system on the valve base for assembly purposes.

BRIEF DESCRIPTION OF THE DRAWINGS

Further details and advantages of the invention will be illustrated by means of an embodiment with reference being made to the accompanying drawings. In the drawings.

DETAILED DESCRIPTION

Figure 1:
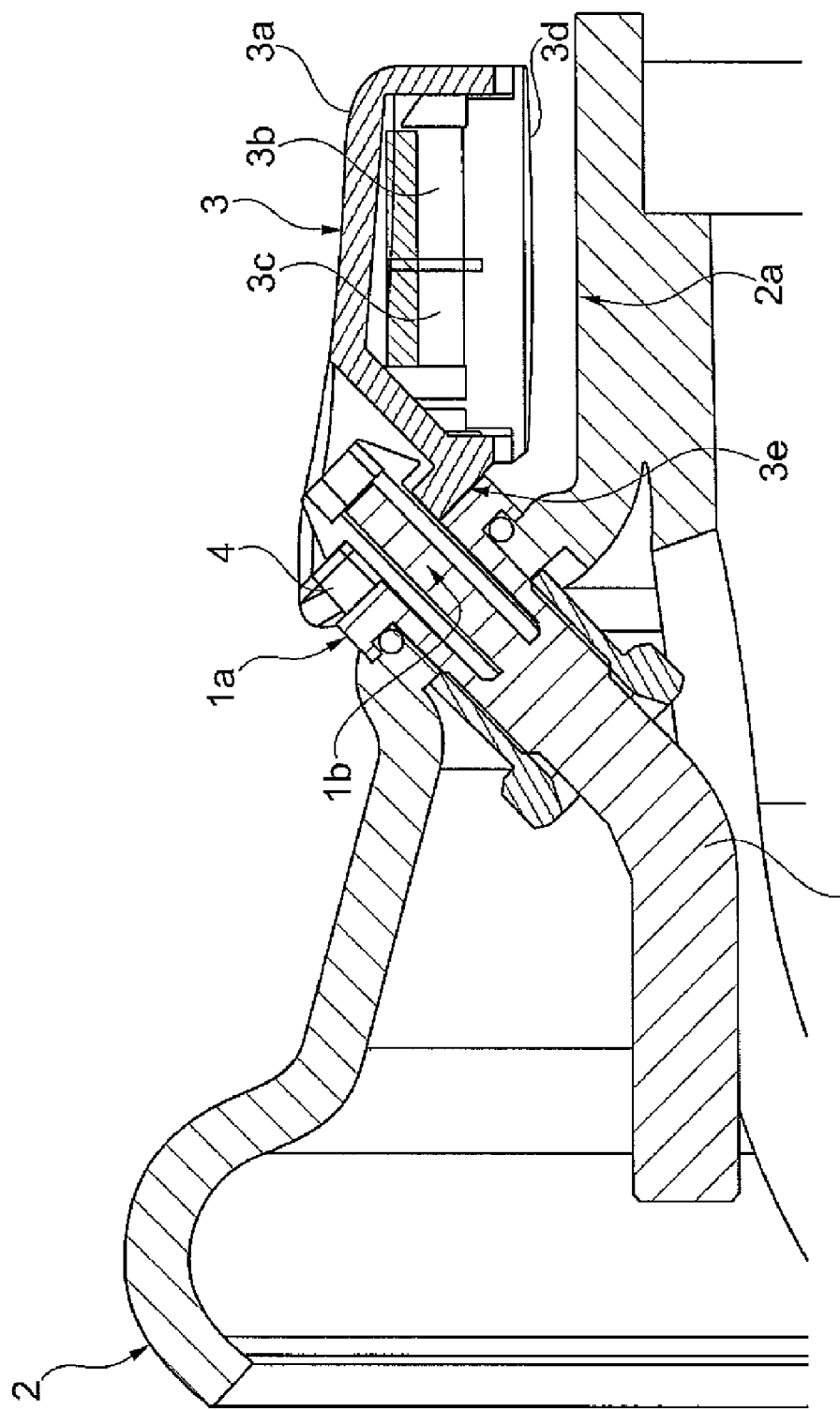
FIG. 1 shows an embodiment of a tire pressure control system according to the invention, the system being arranged on a rim.
Figure 2:
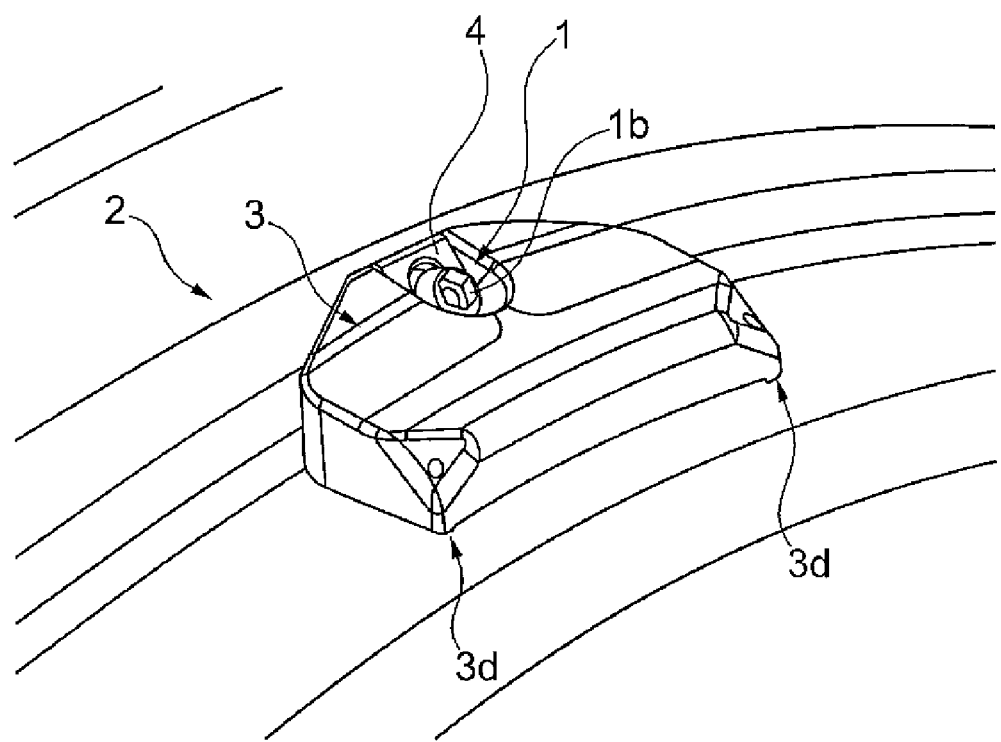
FIG. 2 is an oblique view of the tire pressure control system shown in FIG. 1.

FIGS. 1 and 2 show a tire pressure control system with a tire valve 1 on a rim 2 and a wheel electronic system 3 attached to the valve 1. The wheel electronic system 3 has a housing 3a, in which a pressure measuring device 3b and a transmission device 3c are arranged. Pressure measurement values transmitted by the wheel electronic system 3 can be received and evaluated by means of a suitable receiving apparatus, with the result that a drop in pressure can be signalized to the driver of a vehicle.

FIGS. 1 and 2 show the tire valve 1 and the wheel electronic system 3 together with a rim 2 of a pneumatic tire. The housing 3a has two foot elements 3d on its bottom side, said foot elements 3d being formed as ribs to be placed onto the rim well 2a, and a contact surface 3e on its rear side with which it is seated on the valve base 1a of the tire valve 1. The contact surface 3e has an elongated hole 4, with a hollow screw 1b which is inserted into the valve base 1a projecting through said elongated hole 4. Before the hollow screw 1b is tightened, the contact surface 3e of the wheel electronic system 3 can be linearly displaced on the valve base 1a in the direction of the elongated hole 4. In this manner, the tire pressure control system can be adjusted to the geometric conditions of a given wheel, with the result that it is always possible to achieve a stable three-point support by flatly placing the foot elements 3d which extend along opposite longitudinal sides of the housing 3a onto the rim well 2a. The foot elements 3d of the wheel electronic system rest on the rim well 2a with a section which extends along the longitudinal sides of the housing 3a. This section can extend over the full length of the foot elements 2a or only a part thereof.

In the embodiment shown, the contact surface 3e on the rear side of the wheel electronic system 3 is flat and inclined in relation to the bottom side of the housing. The direction in which the wheel electronic system 3 can be displaced in relation to the tire valve 1 before the hollow screw 1b is tightened is indicated by a double arrow in FIG. 1.

The contact surface 3e of the wheel electronic system 3 is seated on a bearing surface of the valve base 1a, said bearing surface also being formed flat in the embodiment shown and extending inclined in relation to the bottom side of the housing 3 of the wheel electronic system 3a while the tire pressure control system is in its assembled condition. Preferably, the bearing surface is planar, just as is the contact surface 3e resting on it. One or both of these surfaces can, however, also be structured, for example by means of ribs, or can even engage each other in the manner of a tongue and groove, in order to prevent the wheel electronic system 3 from turning out of position. To achieve the ability of linear displacement, it is of advantage in case of structured surfaces if an imaginary line of the contact surface 3e or of the bearing surface of the valve base 1a abutting against it respectively is straight, said imaginary line intersecting an imaginary sectional plane extending in parallel to the elongated hole 4. The structure of such a contact surface has a translational symmetry in the direction of the elongated hole 4, i.e., if a point of the surface is mapped by means of a geometric displacement operation, the image of the mapped point is located in the contact surface.

In the embodiment shown, the elongated hole 4 is arranged in a plate-shaped section of the rear side of the housing. Preferably, this plate-shaped section which forms the contact surface 3e is arranged centrally on the rear side of the housing.

An advantageous further development of the invention provides that an adapter to be attached to the bottom side of the housing 3 be provided and, thus, that the two foot elements 3d that are formed as ribs be extended in downward direction if necessary, with the result that placing is possible even if the rim wells are disposed at a very low level. If, in the case of rim wells that are disposed at a very low level, the maximum displacement distance that is limited by the length of the elongated hole 4 fails to be sufficient for allowing the foot elements 3d to be placed onto the rim well 2a, it is nevertheless possible to achieve a stable support by means of an adapter. An adapter can be used to bridge a potentially missing height compensation and to achieve a stable support on the rim well 2a.

REFERENCE SYMBOLS

1 Tire valve
1a Valve base
1b Hollow screw
2 Rim
2a Rim well
3 Wheel electronic system
3a Housing
3b Pressure measuring device
3c Transmission device
3d Foot elements
3e Contact surface
4 Elongated hole

What is claimed is:

1. A tire pressure control system, comprising
a tire valve and
a wheel electronic system which contains a pressure measuring device and a transmission device in a housing, wherein the housing has on a bottom side two foot elements for placing onto a rim well of a wheel and has, on a rear side, a contact surface for seating on a tire valve base, said contact surface having an elongated hole for enabling the tire valve to project therethrough,
wherein
the contact surface being linearly displaceable on the valve base in the direction of the elongated hole during installation thereby enabling the system to be adjusted to a geometric condition of a given wheel without the use of separate attached components.

2. The tire pressure control system according to claim 1, wherein an imaginary line of the contact surface is straight, said imaginary line intersecting an imaginary sectional plane extending in parallel to the elongated hole.

3. The tire pressure control system according to claim 1, wherein the contact surface is flat.

4. The tire pressure control system according to claim 1, wherein the tire valve comprises a hollow screw which is inserted into the valve base and projects through the elongated hole.

5. The tire pressure control system according to claim 1, wherein the contact surface of the wheel electronic system is seated on a bearing surface of the valve base, said bearing surface being inclined in relation to the bottom side of the housing of the wheel electronic system in assembled condition.

6. The tire pressure control system according to claim 5, wherein in assembled condition an imaginary intersecting line of the bearing surface and an imaginary sectional plane extending in parallel to the elongated hole is straight.

7. The tire pressure control system according to claim 5, wherein the bearing surface is planar.

8. The tire pressure control system according to claim 1, wherein the foot elements are formed as ribs.

9. The tire pressure control system according to claim 1, wherein the foot elements extend along opposite longitudinal sides of the housing.

10. The tire pressure control system according to claim 1, wherein the elongated hole is arranged in a plate-shaped section of the rear side of the housing.

11. The tire pressure control system according to claim 1, wherein the contact surface is inclined in relation to the bottom side of the housing.

12. The tire pressure control system according to claim 1 further comprising a wheel having a rim well and wherein the foot elements of the wheel electronic system rest on the rim well with a section extending along the longitudinal sides of the housing.

13. A wheel electronic system comprising:
a housing; and
a pressure measuring device and a transmission device arranged in said housing, wherein the housing has on a bottom side two foot elements displaceable onto a rim well of a wheel and on a rear side a flat contact surface with an elongated hole displaceable onto a valve base thereby enabling the system to be adjusted to a geometric condition of a given wheel without the use of separate attachment components.

14. The tire pressure control system according to claim 1 wherein the tire valve includes a valve base with a flat bearing surface for the wheel electronic system.

* * * * *